United States Patent
Cicchiello et al.

(10) Patent No.: US 7,171,126 B2
(45) Date of Patent: Jan. 30, 2007

(54) AIRBORNE FREE-SPACE-OPTICAL SYSTEM UTILIZING THREE-TIER, ULTRAFINE STEERING

(75) Inventors: James M. Cicchiello, Cary, IL (US); John Featherston, Fort Wayne, IN (US); Jean Christopher Shelton, Los Gatos, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 576 days.

(21) Appl. No.: 10/675,066

(22) Filed: Sep. 30, 2003

(65) Prior Publication Data
US 2005/0069325 A1    Mar. 31, 2005

(51) Int. Cl.
H04B 10/00 (2006.01)
G02B 26/08 (2006.01)

(52) U.S. Cl. .................. 398/129; 398/131; 398/128; 359/210

(58) Field of Classification Search ........ 398/128–131; 250/201.2–201.8; 359/209–211
See application file for complete search history.

(56) References Cited

U.S. PATENT DOCUMENTS

| | | | | |
|---|---|---|---|---|
| 5,198,653 A | * | 3/1993 | Shen et al. | 250/201.9 |
| 5,710,652 A | * | 1/1998 | Bloom et al. | 398/129 |
| 6,097,522 A | * | 8/2000 | Maerki et al. | 398/122 |
| 6,657,783 B1 | * | 12/2003 | Presby et al. | 359/399 |
| 2002/0046763 A1 | * | 4/2002 | Berrios et al. | 136/244 |

* cited by examiner

Primary Examiner—Jason Chan
Assistant Examiner—Nathan Curs
(74) Attorney, Agent, or Firm—Stetina Brunda Garred & Brucker

(57) ABSTRACT

An optical head is provided for a free space optical communications system. The optical head is utilized for transmitting and receiving modulated infrared laser beams. The optical head includes an optical amplifier, a circulator, an ultrafine-steering element, a fine-steering element, a course-steering element, and a fine track sensor. Additionally, a method is provided for facilitating airborne free space optical communications between an airborne host platform and a link platform. Each platform has an optical head which transmits and receives data via modulated infrared laser beams, wherein the host includes at least an optical head having a fine, coarse, and ultrafine steering element configured in a cascaded three-tier steering element architecture.

36 Claims, 4 Drawing Sheets

AIRBORNE FREE-SPACE-OPTICAL SYSTEM UTILIZING THREE-TIER, ULTRAFINE STEERING

CROSS-REFERENCE TO RELATED APPLICATIONS

Not Applicable.

STATEMENT RE: FEDERALLY SPONSORED RESEARCH/DEVELOPMENT

Not Applicable.

BACKGROUND OF THE INVENTION

1. Field of the Invention

The present invention relates to free-space-optical (FSO) communications. In particular, the present invention relates to an optical head for an airborne FSO communications system. And in more particularity, the present invention relates to a three-tier steering design for an optical head of an airborne FSO communications system.

2. Background of the Invention

As data-throughput requirements increase, the ability to transmit vast amounts of data requires a flexible and secure communications network with very high bandwidth capability. The Department of Defense (DOD) has established several programs to develop such technology. For example, the TeraHertz Operational Reachback (THOR) program has been established to find and demonstrate new ways to handle the DOD's increasing data needs in mobile environments. The objective of the THOR program is to provide secure, assured, high-data-rate, and end-to-end communications to airborne, terrestrial, and surface war fighters.

Free Space Optical (FSO) communications is an emerging technology which will play a major role in accomplishing several aspects of the DOD's objectives. In conventional applications, FSO communications refers to the transmission of modulated infrared (IR) laser beams through the atmosphere to obtain optical communications. Like fiber-optic communications, FSO uses lasers to transmit data, but instead of enclosing the data stream in a glass fiber, it is transmitted through the air or space. To accomplish the transmission, FSO transmits laser beams from one optical head to another optical head which receives the laser beams on highly sensitive photon-detector receivers. To date, FSO communications systems have been statically based-systems mounted between buildings which are subject to minimal movement and vibration.

A more complex and challenging environment is presented, however, when FSO technology is utilized in mobile airborne applications. Airborne FSO communications requires low-jitter pointing, acquisition, and tracking (PAT) solutions. In this environment, the amplitude and frequency of the jitter is platform dependent and dependent on the placement of the aperture with respect to the leading edge of transition to turbulence. For example, concepts of operations (CONOPS) relative to the THOR program require the pointing jitter of a beam of about 100 μrad divergence to be less than about 10 μrad of jitter, which is a generally accepted requirement for pointer-tracker (P/T) subsystems in FSO communications systems. That is to say, it is a requirement for pointer-tracker subsystems in FSO communications systems to point within $\frac{1}{10}$ of the beam divergence. For example, if the beam divergence during tracking is 100 μrad, to satisfy the link budget, then the system must point to within 10 μrad (i.e., achieve jitter of less than 10 μrad). However, this jitter specification is beyond the capability of most available airborne pointer-trackers.

One way of dealing with airborne-platform vibration is to inertially stabilize the pointer-tracker (P/T), by developing larger and heavier systems, or by applying active vibration isolation, or both. The only known pointer-tracker systems that can achieve the aforementioned jitter requirement are expensive and heavy inertially-stabilized systems utilized on larger platforms. This solution, which utilizes coarse and fine steering elements in conjunction with sophisticated inertial stabilization, is too large to install on an unmanned aerial vehicles (UAV's), for example, and it generally does not have the agility needed to quickly (i.e., within approximately 100–200 msec) acquire new link partners in FSO communications systems. The active-isolation designs may be another viable solution for some platforms, but they have difficulty matching the higher frequencies of acoustic vibration on other platforms. And neither the heavy design nor active-isolation design approaches can mitigate aero-optic jitter induced by the boundary layer about the airborne platform.

The aforementioned aero-optic problem relates to the phase error induced by the compressible shear layer close to the airborne platform. That is, while $C_n^2$ values may be quite small for platforms at 30,000 ft, indicating that open-atmosphere disturbances are of little consequence, research indicates that for platforms having a Mach number of about 0.8 or greater, a compressible shear layer will be convecting and evolving past the aperture of the platform that will produce beam jitters on the order of 100 μrad, and significant Strehl-ratio degradation, depending on beam diameter. It is the approximate 100 μrad of jitter, at approximately 1 kHz, along with the known vibration characteristics of several existing platforms (such as UAV's and larger, high-flying platforms), that combine to challenge the 10 μrad jitter requirement of the airborne FSO-communications mission.

A factor that facilitates the mitigation of the jitter problem is the "cooperative" beacon in the form of the link partner. Since the system can rely on this strong positioning signal, the control loop, if fast enough, could continually update steering to account for jitter. That is, full jitter correction would negate the need for inertial stabilization, either through increased mass or through active isolation. Developing a fast enough system is a challenge, however, because fast-steering mirror based designs (FSM's) are not available to provide +/-100 μrad steering at 2–5K kHz, while still steering over several degrees at +/-at 500 Hz. FSM's are utilized in a broad range of line-of-sight stabilization, laser communication, jitter motion compensation, military-targeting systems, optical instrumentation and high-energy laser-pointing applications. The temporal frequencies of the jitter in the compressible-flow regime could be several kHZ, which is beyond the close-loop response of conventional, fast-steering-mirror based (FSM) designs. For example, there is no known FSM available that can provide the conventional steering of approximately +/-3° with a command response of approximately 500 Hz, while still keeping up with jitter (optical tilt) corrections of +/-100 μrad at a 2–5 kHz response.

While other missions, commercial (i.e., airborne imaging of sporting events) and military (i.e., IRCM, targeting), rely today on two-tier pointer-tracker systems, with coarse steering and fine steering anchored to a fine track sensor (FTS), the airborne FSO communications mission requires higher pointing resolution, and further reduction of jitter, while resident in an especially unfriendly environment. So, while the aforementioned prior art comprises of commercially available pointer-tracker systems using coarse and fine steering, these systems in general will not adequately perform in the airborne FSO communications mission.

It would be advantageous and desirable to provide an airborne free space optical (FSO) communications system which overcomes the aforementioned disadvantages of the present airborne FSO communications systems. In particular, it would be beneficial to provide an airborne FSO communications system having low-jitter pointing, acquisition, and tracking (PAT) characteristics. Moreover, it would be advantageous to satisfy the 10 µrad jitter requirement of the airborne FSO based communications mission. For example, it would be advantageous to provide a system with a pointing jitter being less than about 10 µrad for a beam having approximately 100 µrad divergence. Furthermore, it would be desirable to provide conventional steering of ~+/−3° with a command response of ~500 Hz, while still keeping up with jitter (optical tilt) corrections of +/−100 µrad at a 2–5 kHz response. Moreover, it would be desirable to provide a lightweight and less expensive optical head for an airborne FSO communications system which mitigates vibration-induced and aero-optic induced jitter, and as a result, is capable providing a highly refined pointing resolution to the pointer-tracker (P/T) system.

BRIEF SUMMARY OF THE INVENTION

The present invention, which provides a three-tier ultrafine steering design, overcomes and solves the aforementioned problems that have been encountered in the emerging field of airborne free space optical communication systems. The present invention provides a method and device to mitigate vibration-induced and aero-optic-induced jitter on airborne platforms in order to facilitate high-pointing-resolution, pointer-tracker systems for the FSO communications mission.

The ability to communicate between two dynamic, moving airborne platforms via FSO communication is an aspect of the present invention that distinguishes it from terrestrial-based, statically-mounted FSO and fiber-optic telecommunications systems that are known in the art.

In particular, the present invention provides a three-tier steering system that is used by the pointer-tracker system of an airborne FSO. In the three-tier-steering embodiment, coarse, fine, and ultrafine steering elements are cascaded. In each successive tier, the field of regard (FOR) is tightened (allowing for finer steering resolution), and the bandwidth is increased (i.e., the jitter correction relies on the finest tilt, but at the highest bandwidth). For example, coarse steering may handle +/−45 degrees at 20 Hz, fine steering may handles +/−3 degrees at 200 Hz, and ultrafine steering may handle +/−100 µrad at 2 kHz. The ultrafine steering may be provided by a very fast adaptive-optical (AO) subsystem. The adaptive optics may be anchored to several types of high-speed wavefront sensing systems, including curvature sensing.

The coarse-steering element may be either a conventional, gimbal-based design, or it may leverage newer conformal or agile-steering technologies. The primary benefits of this conformal steering technique include minimization of aerodynamic loading and platform observability. Also, agile steering is faster than mechanical systems, it is digitally accessed, easily-scalable, and provides the potential for multiple subapertures.

According to one aspect of the present invention, a method is provided for facilitating airborne free space optical communications between an airborne host platform and a link platform. Each platform has an optical head which transmits and receives data via modulated infrared laser beams. The host includes at least an optical head having a fine, coarse, and ultrafine steering element configured in a cascaded three-tier steering element architecture. The method includes obtaining a priori of pointing information from a network to identify a location of the link platform; transmitting a beam directed to the link platform; adjusting the coarse steering element to point the beam to the link platform within a first specified range of measured units; locating a beacon of the link platform; and dynamically focusing the beam to collapse the divergence of the transmitted beam down to a second specified range of measured units less than the first to facilitate tracking.

According to another aspect of the method, the first specified range of measured units may be about 200–500 µrad and the second specified range of measured units may be about 100 µrad. According to another aspect of the instant method, the field of regard for each successive tier may be tightened within the cascaded three-tier steering element architecture to allow for finer steering resolution. According t another aspect of the instant method, the coarse-steering element has a first field of regard, the fine-steering element has a second field of regard less than the first field of regard, and the ultrafine-steering element has a third field of regard less than the second field of regard. In another aspect of the present invention, the coarse-steering element has a first bandwidth, the fine-steering element has a second bandwidth greater than the first bandwidth, and the ultrafine-steering element has a third bandwidth greater the second bandwidth. In another aspect of the method, jitter is corrected utilizing a finest tilt parameter at the third bandwidth.

According to another aspect of the instant embodiment, the coarse-steering element covers a range of about +/−45 degrees at about 20 Hz, the fine-steering element covers a range of about +/−3 degrees at about 200 Hz, and the ultrafine-steering element covers a range of about +/−100 µrad at about 2000 kHz. According to another aspect of the present method, dynamically focusing includes defocusing the beam by utilizing an adaptive-optical element, wherein the adaptive-optical element may be a deformable mirror. Another aspect of the method includes transitioning to a tracking mode wherein the link platform's transmission beam is used as a beacon, wherein during the tracking mode the beacon of the link platform remains within a field of regard of the coarse-steering element and fine-steering element by using a fine track sensor.

According to another aspect, the method includes utilizing a nested control loop to dovetail both fields of regard and command response times of the fine, coarse, and ultrafine steering elements to control jitter. Furthermore, the nested control loop receives the priori of pointing information from the network and accounts for dynamic focusing during acquisition. Moreover, the nested control loop includes an outer nested loop and an inner nested loop, and wherein the outer nested loop controls the coarse-steering element and fine-steering element and the inner nested loop controls the ultrafine-steering element.

According to another aspect, the method includes utilizing a fine-tracking sensor for anchoring the coarse-steering element and the fine-steering element, and utilizing a wavefront sensor to anchor the ultrafine-steering element, wherein the ultrafine-steering element may be an adaptive-optical element comprising a deformable mirror anchored to a wavefront sensor comprising curvature sensor. Moreover, the ultrafine-steering adaptive-optical element may further rely on its own dedicated controller for commanding the deformable mirror based on acquisitions of the wavefront sensor.

Additionally, the present invention provides an optical head for a free space optical communications system, which is utilized for transmitting and receiving modulated infrared laser beams. The optical head includes an optical amplifier, a circulator, an ultrafine-steering element, a fine-steering element, a course-steering element, and a fine track sensor.

According to another aspect of the present invention, the ultrafine steering element includes an adaptive-optical element which may be a deformable mirror adapted to utilize a high-speed curvature sensing technique. Moreover, the adaptive optic element may adapted to be dynamically focused and defocused.

According to another aspect of the present invention, the ultrafine-steering, fine-steering, and coarse-steering elements may be configured in a cascaded three-tier steering element architecture, wherein for each successive tier within the cascaded three-tier steering element architecture, a field of regard may be tightened allowing for finer steering resolution. Additionally, the coarse-steering element has a first field of regard, the fine-steering element has a second field of regard less than the first field of regard, and the ultrafine steering element has a third field of regard less than the second field of regard.

According to other aspects, the coarse-steering element has a first bandwidth, the fine-steering element has a second bandwidth greater than the first bandwidth, and the ultrafine-steering element has a third bandwidth greater than the second bandwidth, wherein jitter correction relies on a finest tilt parameter at the third bandwidth. And yet other aspects of the present invention include the coarse-steering element covers a range of about +/−45 degrees at about 20 Hz, the fine-steering element covers a range of about +/−3 degrees at about 200 Hz, and the ultrafine-steering element covers a range of about +/−100 μrad at about 2 kHz.

Still further aspects of the present invention include the optical amplifier being an erbium-doped fiber amplifier (EDFA). Furthermore, another aspect of the present invention is a common optical path that supports both transmitted and received beams between the circulator and the ultrafine-steering element. Additionally, the present invention may include a beam splitter arranged between said ultrafine-steering element and said fine-steering element, wherein the beam splitter may be rated for beams having a wavelength of about 1.55 μm.

Also, an aspect of the present invention includes the fine track sensor positioned to receive beams from the beam splitter, wherein the fine track sensor along with the coarse-steering and fine-steering elements are utilized to track a link platform. Another aspect of the present invention includes the fine-steering element being a fast-steering mirror and the coarse-steering element being an electro-opto-mechanical assembly. Furthermore, the present invention may include a pointer/tracker controller electrically connected to the ultrafine, fine, and coarse steering elements and to the fine tracker sensor. Moreover, according to an aspect of the present invention, the ultrafine-steering element includes an embedded wavefront sensor and controller.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Overview of Airborne, the Free-Space-Optical Communications System

Figure 1:
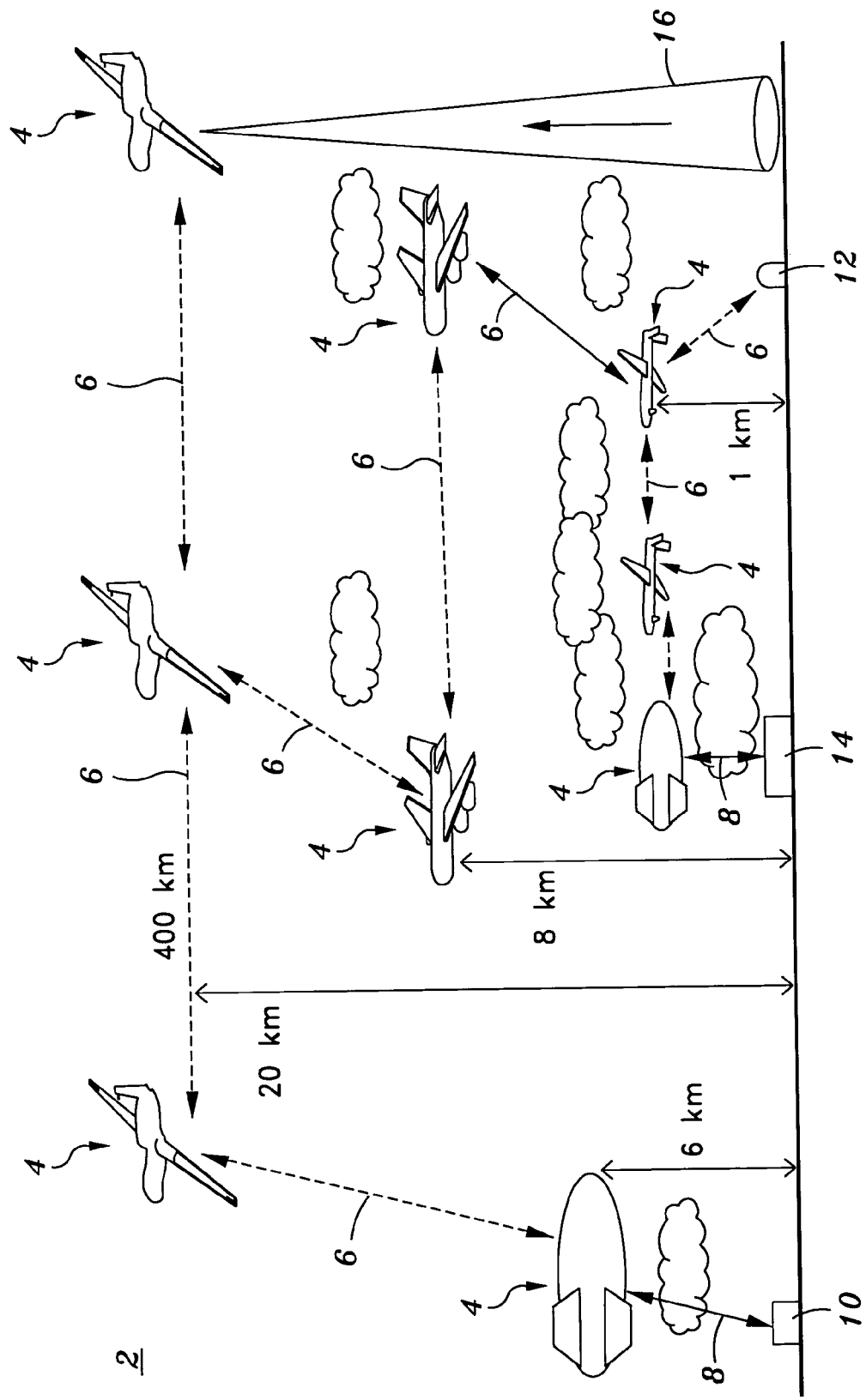
FIG. 1 is an illustration of an exemplary airborne network according to an aspect of the present invention.

The present invention provides an airborne, free-space-optical (FSO) communications system which may be utilized by a variety of airborne platforms such as unmanned aerial aircraft, manned aircraft, tethered aircraft, and commercial aircraft to name a few (referred herein after as "aircraft"). As shown in FIG. 1, the airborne FSO communication system may be comprised of a plurality of flying airborne platforms 4, integrated onto aircraft, that compose an airborne network 2. In this instance, FIG. 1 illustrates an embodiment of airborne network 2 which is being planned to support the THOR program. However, it is evident the present invention may be utilized in other embodiments and variants of airborne networks 2 and should not be limited to the embodiment depicted in FIG. 1.

In the embodiment shown in FIG. 1, unmanned aerial vehicles (UAV's), manned aircraft, and tethered aircraft, establish airborne network 2 through FSO laser communication links 6. A fiber-optic point of presence 10 from the ground may be extended through a fiber-optic cable 8 to a tethered airborne platform 4 to establish the broadband link with the airborne network 2. The airborne network 2 is then able to facilitate connectivity of the theater of operations, such as operations headquarters 14, ground sensors 12, or to support POTS (plain old telephone service) communications 16. The airborne network 2 is considered operational when a sufficient number of airborne platforms 4 are available to facilitate reliable data transfer from an individual airborne platform 4 to the rest of the airborne platforms 4 forming the airborne network 2.

Description of the Airborne Terminal

Figure 2:
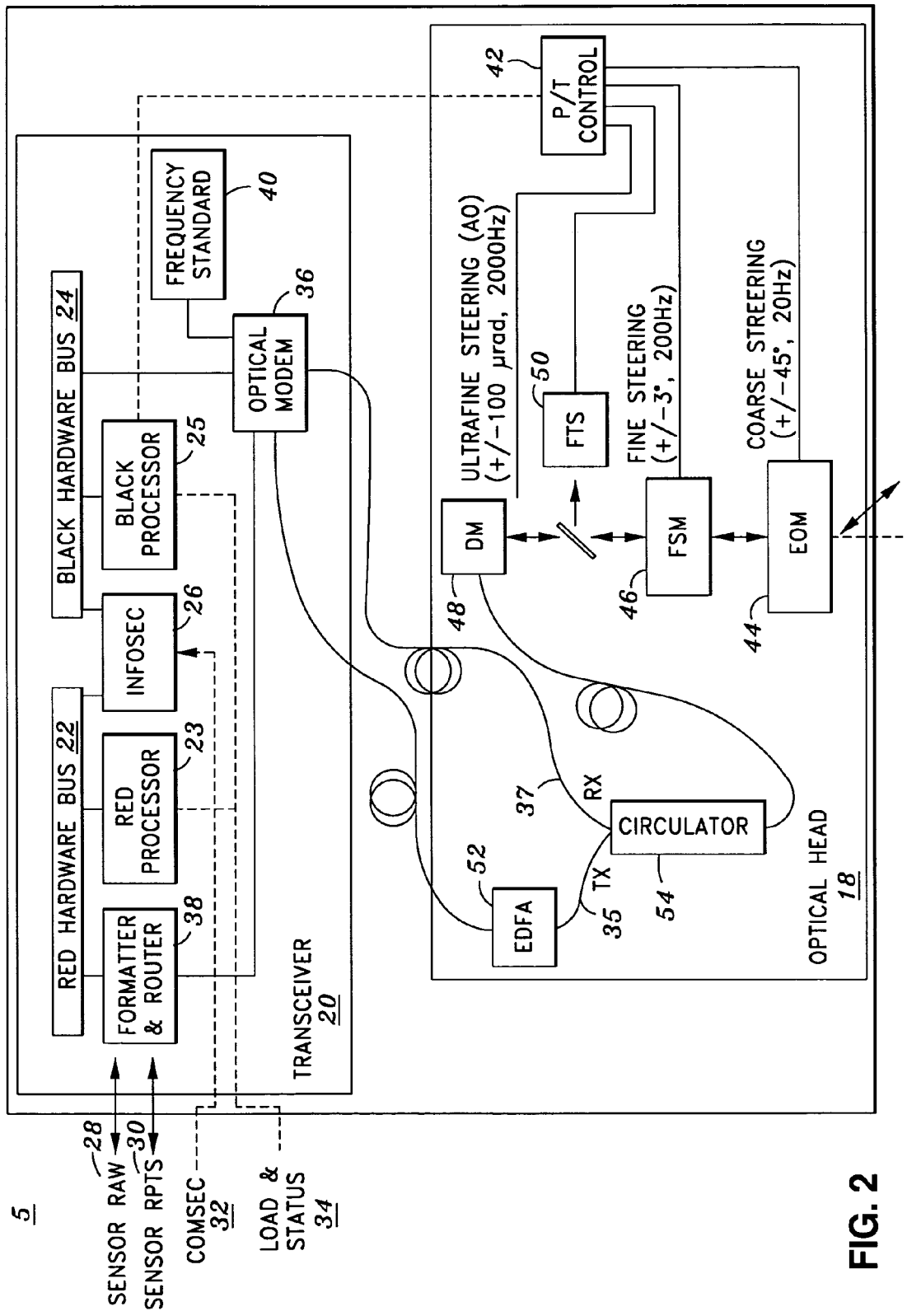
FIG. 2 is a general schematic of an exemplary embodiment of an airborne optical head having a three-tier steering design according to an aspect of the present invention.

FIG. 2 depicts an airborne terminal 5 which is utilized in each airborne platform 4. Airborne terminal 5 is composed of two main components, including an optical head 18 and transceiver 20. A link partner may carry a plurality of terminals 5 depending on the desired communications capacity required of each individual platform 4. Since each terminal 5 has a coverage of about 2 steradians (sr) solid angle, a suite of six terminals on the platform 4 provides full coverage of about $4\pi$ sr solid angle in which plumes are considered to be hard obscurations. However, depending on the specific application, a platform 4 may have a varying number of terminals 5. Each airborne platform 4, or "link partner," participating in the airborne network 2 carries at least one terminal 5. Each terminal 5 on each airborne platform 4 is capable of both acquiring other link partners, and tracking them, while both the host platform and the link platform are moving. The acquisition of link partners relies on a priori pointing information 66 (see FIG. 3) giving the approximate positions of the various platforms 4. The acquisition of link partners will be described in further detail later in the specification.

Each terminal 5 comprises of an optical head 18 and a transceiver 20. Transceiver 20 includes a "red" hardware bus 22 and a "black" hardware bus 24. A red processor 23 processes unencrypted data and a black processor 25 processes encrypted data. Both processors 23, 25 are linked by an information-security ("infosec") module 26. Transceiver 20 receives from airborne platform 4 a raw-sensor data stream 28 ("sensor raw") and/or a processed-sensor data stream 30 ("sensor rpts"), along with encryption parameters 32 ("comsec") and configuration parameters 34 ("load & status"). A formatter and router 38 and frequency-standard module 40 are also integrated into the architecture of transceiver 20. The transceiver 20 then provides, via an optical modem 36, a high-data-rate stream of optically-modulated information to the optical head 18, for transmission to the link partner. It is noted that both optical modem 36 and optical head 18 are designed to communicate via a variety of modulation-detection schemes known in the art that are designed for modulation of optical signals.

Detailed Description of the Optical Head Having a Three-Tier Steering Design

The optical head 18 is the component of the present invention which implements a coarse steering, fine steering and high-speed, adaptive-optical correction that enables airborne platforms 4 to maintain FSO communication links 6 between each other while in flight. This can be accomplished because optical head 18 utilizes a three-tier steering design which provides sufficient spatial and temporal resolution in the presence of vibration and significant boundary-layer ("aero-optic") disturbances.

The optical head 18 comprises an erbium-doped fiber amplifier (EDFA) 52, a circulator 54, an ultrafine-steering element 48, a separate fine-steering element 46, and a separate coarse-steering element 44. The ultrafine-steering element 48 may comprise and adaptive optical element (also referred by reference numeral 48), which for instance, may be a deformable mirror (DM). The fine-steering element may be a fast-steering mirror (FSM). The coarse-steering element 44 may be an electro-opto-mechanical assembly (EOM). Additionally, the optical head 18 may further comprise a fine-track sensor (FTS) 50 and a pointer-tracker (P/T) controller 42. Each steering element 44, 46, 48 is controlled by the pointer-tracker controller 42 for beam control. The aforementioned components will be further described later in the specification.

The exemplary embodiment of optical head 18 shown in FIG. 2 has several design aspects herein described below. First, a common optical path 39 supports both transmit 35 and receive beams 37 in order to minimize complexity and space, thus, minimizing the need for multiple components. Additionally, the common optical path 39 facilitates transmit-side adaptive optics 48 for both link partners. Because common optical path 39 is used, two different colors $\lambda_T$ and $\lambda_R$ may be utilized to minimize optical cross talk to insure rejection of effectively stray light in the beam control and detection processes. Second, in order to satisfy the link budget, substantial amplification of the source is provided by EDFA 52, where the source is a narrow-line-width, tunable laser at about $\lambda=1.55$ μm. Third, wavelength hopping may be utilized to provide additional security, wherein optical head 18 is designed to steer all wavelengths within the C-band with acceptable resolution. And fourth, link acquisition involves dynamic focusing and defocusing of the ultrafine-steering adaptive-optical (AO) element 48.

Optical head 18 incorporates a three-tier steering design which utilizes coarse 44, fine 46, and ultrafine 48 steering elements which have a cascaded architecture as shown in FIG. 2. In each successive tier, the field of regard (FOR) is tightened allowing for finer steering resolution. Moreover, the bandwidth is increased (i.e., the jitter correction relies on the finest tilt, but at the highest bandwidth). For example, coarse steering may handle +/−45 degrees at 20 Hz, fine steering may handle +/−3 degrees at 200 Hz, and ultrafine steering may handle +/−100 μrad at 2 kHz. The ultrafine steering 48 is provided by a very fast adaptive-optical element which may rely on high-speed curvature sensing. By "dovetailing" both fields of regard (FOR) and command-response times of the coarse 44, fine 46, and ultrafine 48 elements, high-resolution jitter control is facilitated without sacrificing total FOR and system speed of acquisition.

The fields of regard (FOR) of the coarse-steering 44, fine-steering 46, and ultra-fine steering 48 elements are configured to overlap. For example, coarse-steering element 44 provides coverage over 0–45° EL and 360° Az, while fine-steering element 46 provides +/−1.5° coverage, and the ultrafine-steering adaptive-optical element 48 provides +/−300 μrad of tilt correction. The innermost, fastest element is ultrafine-steering adaptive-optical element 48 which may have a bandwidth of approximately 2–5 kHz. The bandwidth of the fine-steering element 46 may be approximately 500 Hz, and the bandwidth of the agile, coarse-steering element 44 is more than sufficient at approximately 1 kHz.

Nested Control Loop

Figure 3:
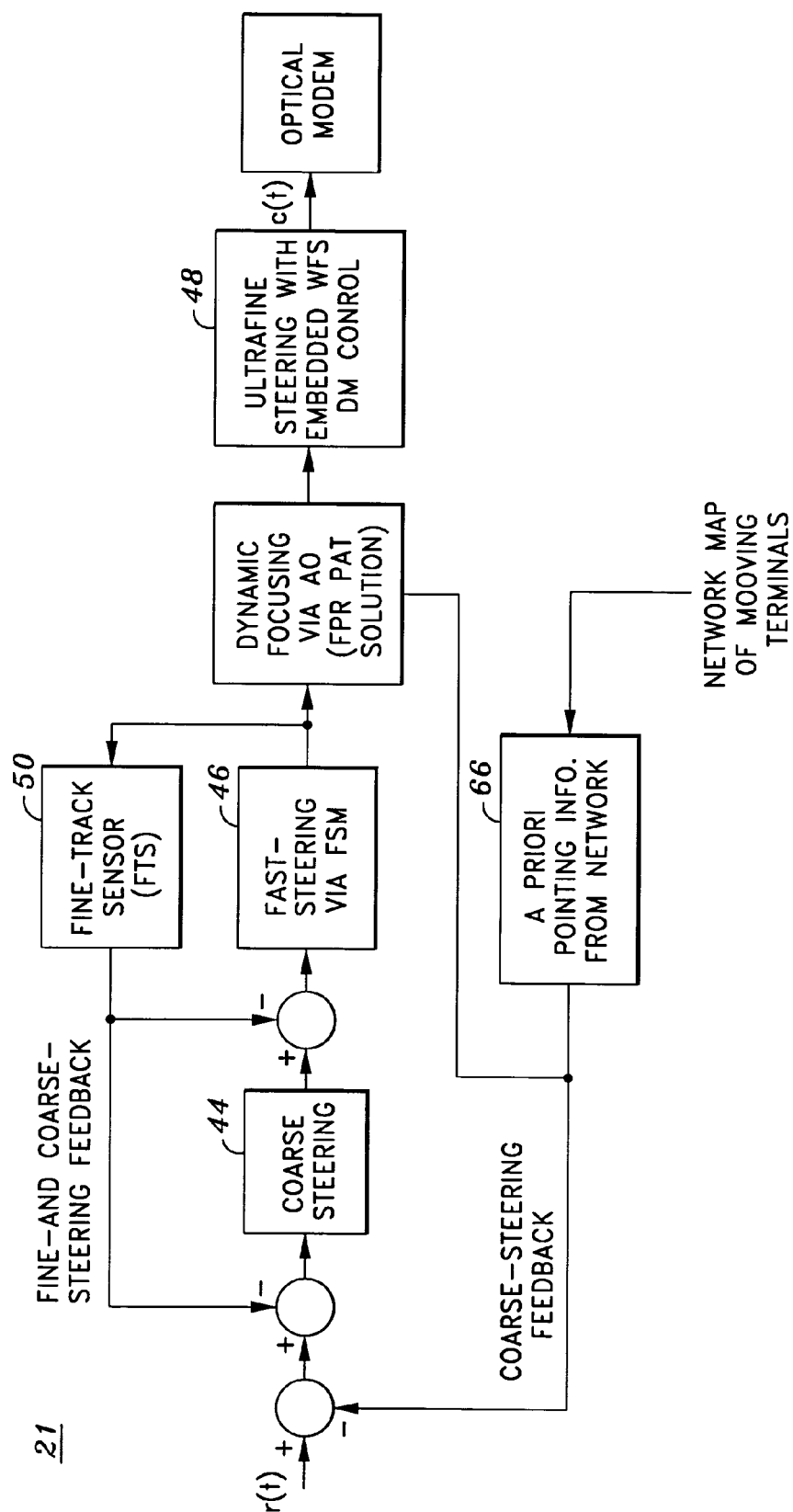
FIG. 3 is a schematic of a nested control loop utilized in the exemplary embodiment of the airborne optical head according to an aspect of the present invention.

FIG. 3 is a schematic of a nested control loop 21 utilized in the exemplary embodiment of the airborne optical head 18 according to an aspect of the present invention. The nested control loop 21 interfaces with network information on moving platforms 4, and accounts for dynamic focusing during acquisition. The nested control loop 21 includes an outer nested loop and an inner nested loop. The outer nested loop comprises the coarse-steering element 44 and fine-steering 46 element (via a fast-steering mirror). The inner nested loop includes the ultrafine-steering adaptive-optical element 48 which may be a deformable mirror (DM). Two tracking sensors may be used in tandem to anchor the nested control loop 21. First, fine-tracking sensor (FTS) 50, which may have a FOR of about 3°×3°, is utilized for anchoring the coarse-steering element 44 and the fine-steering element 46.

A wavefront sensor (WFS) is utilized to anchor the ultrafine-steering adaptive-optical element 48. For example, with respect to the inner nested loop, the ultrafine-steering adaptive-optical element 48 may comprise a deformable mirror (DM) anchored to its own dedicated feedback element [i.e., a wavefront sensor (WFS)], which in the exemplary embodiment may be a curvature sensor. The ultrafine-steering adaptive-optical element 48 also relies on its own, dedicated controller, allowing it to be very fast with respect to commanding the deformable mirror (DM) based on acquisitions of the wavefront sensor (WFS).

The nested control loop 21 begins with a priori pointing information 66, comprising at least a network map of moving terminals, from the network 2. In the "acquisition mode", the pointing information 66 directs the optical head 18 to the location of the link partner. Next, the coarse-steering element 44 adjusts to point to the link partner. In the acquisition, the beam is slightly defocused to facilitate a larger angle of divergence, where the defocusing is provided dynamically by the adaptive-optical element 48, which may be the deformable mirror (DM). Once the beacon from the link partner is witnessed by the fast-track sensor (FTS), the beam is focused down by the deformable mirror (DM) to a narrower angle of divergence, providing more signal to the link partner, and establishing the link. The optical head 18 then transitions to a "tracking" mode. In the tracking mode, the beacon of the link partner remains within the field of regard of the coarse-steering element 44 and the fine-steering element 46, which is a fast-steering mirror (FSM) in the exemplary embodiment, and the beacon is also maintained within the field of regard of the ultrafine-steering subsystem 48.

The nested control loop 21 further depends on the actuating elements (i.e., the coarse-steering 44, fine-steering 46, and ultrafine-steering 48 elements) being progressively faster in response, by approximately an order of magnitude, so that the outer nested loop 68 and an inner nested loop 70 complement one another rather than compete with one another. In an analogous fashion to the fields of regard (FOR) of the coarse-steering 44, fine-steering 46, and ultrafine-steering 48 elements, which are configured to overlap, there are crossover frequencies between successive stages of the nested control loop 21. In the exemplary embodiment, the coarse-steering element 44 may be commanded at about 50 Hz, the fine-steering element 46 may be commanded at about 500 Hz, and the ultrafine-steering element 48 may be commanded at about 5 kHz. It is the speed of the tilt correction provided by the ultrafine-steering element 48 that make possible high-resolution pointing on a fast-moving airborne platform 4 in the presence of aero-optic-induced jitter.

An Exemplary Hardware Embodiment of an Optical Head

Figure 4:
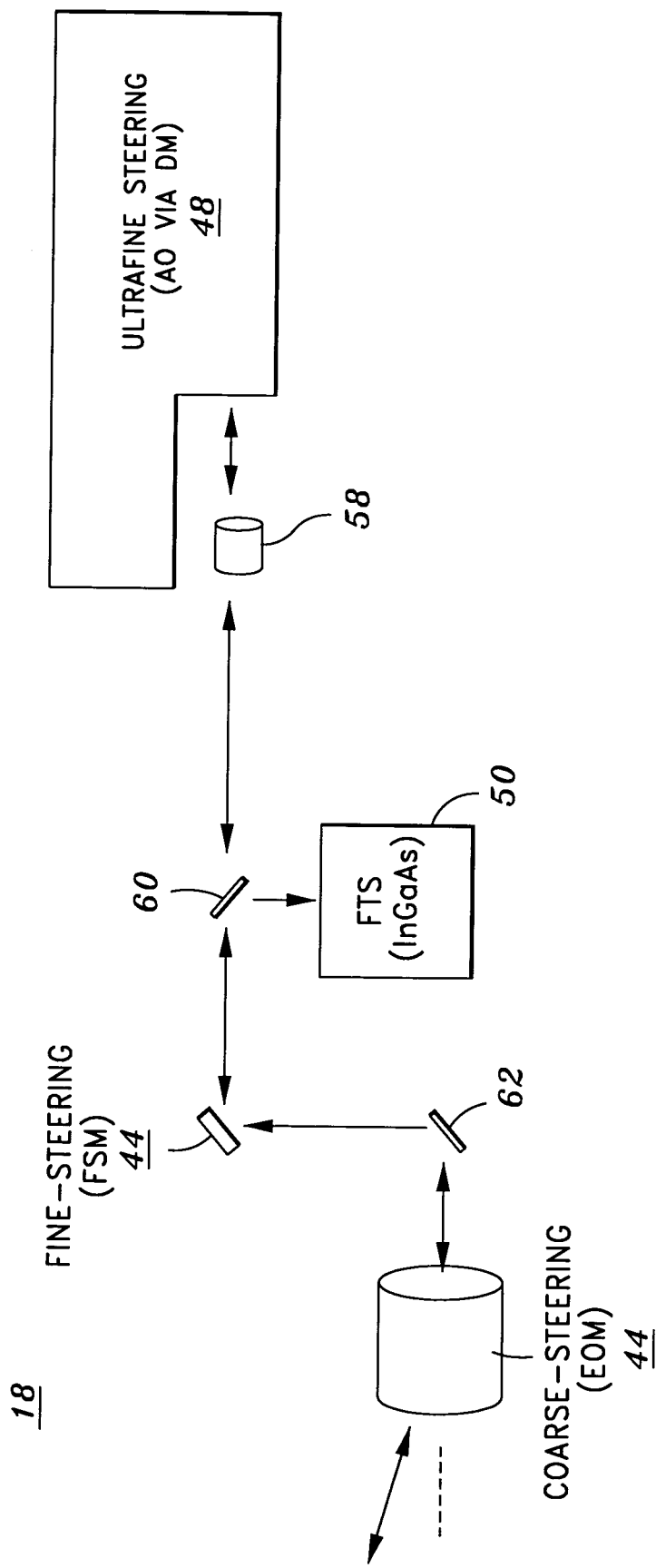
FIG. 4 is a schematic of exemplary hardware components utilized in the exemplary embodiment of the airborne optical head according to an aspect of the present invention.

FIG. 4 is a schematic of exemplary hardware components utilized in the exemplary embodiment of optical head 18 according to an aspect of the present invention. The ultrafine-steering adaptive-optical (AO) element 48 may be an AOptix model R2.5 transceiver. The aforementioned AOptix hardware relies on curvature sensing, and provides significant benefits over Shack-Hartmann wavefront-sensing approaches, including (1) curvature sensing that does not require a reference wavefront; (2) curvature sensing which is not hindered by amplitude variations over the aperture, as would be caused by scintillation; and (3) curvature sensing which facilitates a simpler wavefront-reconstruction algorithm, meaning it has the potential of being extremely fast. By using adaptive optics at both the receive and transmit ends of a link, these communication links greatly reduce the effects of atmospheric disturbances, and therefore, reduce the resulting fades and dropouts.

Auxiliary optics 58 and a beam splitter 60 may be positioned between the ultrafine-steering element 48 and fine-steering element 46. The fine track sensor 50 may be a commercially available InGaAs camera, for instance, with a 320 Hz full window frame rate. The fine-steering element 46 and coarse-steering element 44 may be either conventional, gimbal-based elements, or agile, or conformal, elements. For example, fine-steering element 46 may be a conventional, fast-steering mirror (FSM), or a next-generation, agile-steering element. In particular, fine-steering element 46 may be a Newport model FSM-200-03, with a clear aperture of 25.4 mm, a range of +/−3° (optical), a resolution of 1 μrad and a bandwidth of 550 Hz (for 100 μrad steer). Additionally, between the fine-steering element 46 and the coarse steering element 48 may be a static steering mirror for alignment 62. The coarse-steering element 44 may be an electro-opto-mechanical assembly (EOM) provided by Rockwell Scientific Company (RSC) which a resolution of +/−1.5°, and a frame update of 500 Hz.

Functionality of the Airborne, Free Space Optical Communications System

Additional details of the how optical head 18 facilitates airborne FSO communications are now described below. Initially, dynamic focusing of the ultrafine-steering adaptive-optical (AO) element 48 is required in the acquisition step. As such, the host terminal will use pointing information, provided by a lower-data-rate, RF transmission, to point to the proposed link partner to within about 200–500 μrad. Upon seeing the beacon of the link partner (where the beacon could be an auxiliary, more-broadly-divergent source, or the actual transmission source), the host partner will, via dynamic focusing, collapse the divergence of the transmitted beam down to within 100 μrad. This narrowly-divergent beam will satisfy the link budget for reasonably-powered lasers (that is, relying on available telecommunications components), although it places a new demand on pointing accuracy.

The use of dynamic focusing is afforded by the ultrafine-steering adaptive-optical (AO) element 48 which allows for the agile widening and narrowing of the beam in the far field by 100's of μrad. This control of beam divergence is sufficient to both acquire and track the link partner, as long as a prior pointing information 66 is available. This feature obviates the need for mechanically-adjustable optics in the acquisition step. In particular, it is noted that the collapse of beam divergence by dynamic focusing is a feature facilitated directly by the integration of the ultrafine-steering adaptive-optical (AO) element 48 into optical head 18. The ability of the ultrafine-steering adaptive-optical (AO) element 48 to provide prescribed curvatures, and agile selection of optical power, on top of the high-speed jitter (i.e., optical tilt) correction and wavefront correction that it would be providing already, obviates the need for a mechanically-adjustable optical subsystem, and significantly simplifies the larger system.

Once the link partner is acquired, it will be tracked by the host partner, using the fine-track sensor (FTS) 50 along with coarse-steering 44 and fine-steering 46 elements. Fine-track sensor (FTS) 50 will continually view the link partner's transmission beam, using it as the beacon, and threshold and centroid it to provide steering information, primarily to fine-steering element 46.

In transmit mode, optical transmitter 20 provides, via optical fiber 35, a modulated lower-power, high-data rate signal of about 1.55 μm to optical head 18. The optical head 18 will initially amplify the signal to about 1.0 W via the EDFA 52. Next, the beam is coupled and collimated from the fiber to free space via circulator 54. Then, the adaptive optical subsystem 56 imposes a correction onto the transmitted wavefront based on a continuous sampling of atmospheric and aero-optic disturbances, thus, providing ultrafine-steering adaptive-optical (AO) element 48. Next, fine-steering element 46 and coarse-steering element 44 provide tracking of the link partner.

In receive mode, the transmitted data stream is coupled into the cooperative optical head 18 of another airborne platform 4, the wavefront is directed along an analogous path and processed in a reverse order, coupled to an receiving optical fiber 37, and received by optical modem 36.

Other Embodiments

In addition to the THOR program, the present invention may be utilized in other airborne applications requiring very-high-resolution pointing. For instance, the three-tier steering solution may be utilized in an "Airborne Lasercom Terminal". In the longer-range, air-to-space CONOPS, jitter is an especially vexing challenge. While this mission is not necessarily hampered by open-path, atmospheric disturbances (because $C^2_n$ will be quite small above 30,000 ft), it does have to address aircraft boundary-layer and aero-optic disturbances, depending on the placement of the aperture about the platform, and it must also address platform vibration.

Moreover, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A method for facilitating airborne free space optical communications between an airborne host platform and a link platform, each platform having an optical head which transmits and receives data via modulated infrared laser beams, wherein the host comprises at least an optical head having a fine, coarse, and ultrafine steering element configured in a cascaded three-tier steering element architecture, the method comprising;
    obtaining a priori of pointing information from a network to identify a location of the link platform;
    transmitting a beam directed to the link platform;
    adjusting the coarse steering element to point the beam to the link platform within a first specified range of measured units;
    locating a beacon of the link platform;
    dynamically focusing the beam to collapse the divergence of the transmitted beam down to a second specified range of measured units less than the first to facilitate tracking; and
    tightening a field of regard for each successive tier within the cascaded three-tier steering element architecture to allow for finer steering resolution.

2. The method according to claim 1, wherein the first specified range of measured units is about 200–500 μrad.

3. The method according to claim 1, wherein the second specified range of measured units is about 100 μrad.

4. The method according to claim 1, wherein the coarse-steering element has a first field of regard, the fine-steering element has a second field of regard less than the first field of regard, and the ultrafine-steering element has a third field of regard less than the second field of regard.

5. The method according to claim 1, wherein the coarse-steering element has a first bandwidth, the fine-steering element has a second bandwidth greater than the first bandwidth, and the ultrafine-steering element has a third bandwidth greater the second bandwidth.

6. The method according to claim 5, further comprising correcting jitter utilizing a finest tilt parameter at the third bandwidth.

7. The method according to claim 1, wherein the coarse-steering element covers a range of about +/−45 degrees at about 20 Hz, the fine-steering element covers a range of about +/−3 degrees at about 200 Hz, and the ultrafine-steering element covers a range of about +/−100 μrad at about 2000 kHz.

8. The method according to claim 1, wherein dynamically focusing includes defocusing the beam by utilizing an adaptive-optical element.

9. The method according to claim 8, wherein the adaptive-optical element is a deformable mirror.

10. The method according to claim 1, further comprising utilizing a nested control loop to dovetail the fields of regard for each successive tier and command response times of the fine, coarse, and ultrafine steering elements to control jitter.

11. The method according to claim 10, wherein the nested control loop receives the priori of pointing information from the network and accounts for dynamic focusing during acquisition.

12. The method according to claim 10, wherein the nested control loop includes an outer nested loop and an inner nested loop, and wherein the outer nested loop controls the coarse-steering element and fine-steering element and the inner nested loop controls the ultrafine-steering element.

13. The method according to claim 12, further comprising utilizing a fine-tracking sensor for anchoring the coarse-steering element and the fine-steering element, and utilizing a wavefront sensor to anchor the ultrafine-steering element.

14. The method according to claim 13, wherein the ultrafine-steering element is an adaptive-optical element comprising a deformable mirror anchored to a wavefront sensor comprising a curvature sensor.

15. The method according to claim 14, wherein the ultrafine-steering adaptive-optical element further relies on its own dedicated controller for commanding the deformable mirror based on acquisitions of the wavefront sensor.

16. An optical head for a free space optical communications system, said optical head utilized for transmitting and receiving modulated infrared laser beams, said optical head comprising:
    an optical amplifier for amplifying an infrared laser beam to be transmitted;
    a circulator coupled to the amplified infrared laser beam;
    an ultrafine-steering element in optical communication with the circulator;
    a fine-steering element in optical communication with the ultrafine-steering element;
    a coarse-steering element in optical communication with the fine-steering element; and
    a fine track sensor coupled to the modulated infrared laser beam.

17. The optical head according to claim 16, said ultrafine steering element comprising an adaptive-optical element.

18. The optical head according to claim 17, said adaptive-optical element comprising a deformable mirror.

19. The optical head according to claim 17, said adaptive-optical element adapted to utilize a high-speed curvature sensing technique.

20. The optical head according to claim 19, said adaptive optic element adapted to be dynamically focused and defocused.

21. The optical head according to claim 16, said ultrafine-steering, fine-steering, and coarse-steering elements configured in a cascaded three tier steering element architecture.

22. The optical head according to claim 21, wherein for each successive tier within the cascaded three-tier steering element architecture, a field of regard may be tightened allowing for finer steering resolution.

23. The optical head according to claim 16, wherein said coarse-steering element has a first field of regard, said fine-steering element has a second field of regard less than the first field of regard, and said ultrafine steering element has a third field of regard less than the second field of regard.

24. The optical head according to claim 16, wherein said coarse-steering element has a first bandwidth, said fine-steering element has a second bandwidth greater than said first bandwidth, and said ultrafine-steering element has a third bandwidth greater than said second bandwidth.

25. The optical head according to claim 24, wherein jitter correction relies on a finest tilt parameter at the third bandwidth.

26. The optical head according to claim 16, wherein said coarse-steering element covers a range of about +/−45 degrees at about 20 Hz, said fine-steering element covers a range of about +/−3 degrees at about 200 Hz, and said ultrafine-steering element covers a range of about +/−100 μrad at about 2 kHz.

27. The optical head according to claim 16, said optical amplifier comprising an erbium-doped fiber amplifier (EDFA).

28. The optical head according to claim 16, further comprising a common optical path that supports both transmitted and received beams between said circulator and said ultrafine-steering element.

29. The optical head according to claim 16, further comprising a beam splitter arranged between said ultrafine-steering element and said fine-steering element.

30. The optical head according to claim 29, said beam splitter rated for beams having a wavelength of about 1.55 μm.

31. The optical head according to claim 29 said fine track sensor positioned to receive beams from said beam splitter.

32. The optical head according to claim 31, wherein said fine track sensor along with said coarse-steering and fine-steering elements are utilized to track a link platform.

33. The optical head according to claim 16, said fine-steering element comprising a fast-steering mirror.

34. The optical head according to claim 16, said coarse-steering element comprising an electro-opto-mechanical assembly.

35. The optical head according to claim 31, further comprising a pointer/tracker controller electrically connected to said ultrafine, fine, and coarse steering elements and to said fine tracker sensor.

36. The optical head according to claim 18, wherein the ultrafine-steering element further comprises an embedded wavefront sensor and controller.

* * * * *